United States Patent [19]

Berardi

[11] Patent Number: 5,181,478
[45] Date of Patent: Jan. 26, 1993

[54] AMPHIBIOUS VEHICLE WITH RETRACTABLE WHEELS

[76] Inventor: Sebastiano Berardi, 2805, Place de Manseau, Laval, Québec, Canada, H7E 5G1

[21] Appl. No.: 812,018

[22] Filed: Dec. 23, 1991

[51] Int. Cl.⁵ .............................................. B63C 35/34
[52] U.S. Cl. ................................ 114/270; 114/344; 440/5
[58] Field of Search .................. 114/61, 123, 183 R, 114/270, 344; 440/5

[56] References Cited

U.S. PATENT DOCUMENTS

| | | | |
|---|---|---|---|
| 2,851,705 | 9/1958 | Smith et al. | 114/344 |
| 3,414,917 | 12/1968 | Harrington | 114/344 |
| 3,618,149 | 11/1971 | Christensen | 114/344 |
| 3,765,368 | 10/1973 | Asbeck | 114/270 |
| 4,050,396 | 9/1977 | Ridgeway | 114/183 R |
| 4,085,697 | 4/1978 | Gaassenbeek | 114/270 |
| 4,433,634 | 2/1984 | Coast | 114/270 |
| 4,671,774 | 6/1987 | Owsen | 114/270 |
| 4,958,584 | 9/1990 | Williamson | 114/270 |

Primary Examiner—Jesus D. Sotelo
Assistant Examiner—Stephen P. Avila
Attorney, Agent, or Firm—ROBIC

[57] ABSTRACT

An amphibious vehicle with retractable wheels that revolves through the sides of hull between a retracted position inside an enclosure and a ground engaging position. The vehicle has three wheels on each side or a set of caterpillar tracks. A hatch panel closes hermetically the enclosure on each side so the water can be removed from them in order to make the vehicle lighter and more buoyant. A sliding propeller used to propel the vehicle while in water. With the wheels inside and the hatch panel closed, the vehicle can attain high speed with a great maneuverability. This vehicle is very suitable for transportation in remote areas with lakes or rivers to cross.

19 Claims, 3 Drawing Sheets

AMPHIBIOUS VEHICLE WITH RETRACTABLE WHEELS

FIELD OF THE INVENTION

The present invention is concerned with an amphibious vehicle wherein two sets of wheels on each side of the buoyant hull of the vehicle rotate outward and downward between a retracted position and a position which they will be able to engage the ground for land-cruising. When the wheels are retracted, a hatch panel covers the wheel enclosure so that the hull has a hydrodynamic surface when the vehicle is water-cruising.

This type of vehicle is very suitable for transportation in remote areas with lakes or rivers to cross. It may also be suitable for mineral exploration or military purposes.

DESCRIPTION OF THE PRIOR ART

Most small amphibious vehicles known in the prior art are provided with fixed wheels that do not allow high water cruising speeds since the wheels generate a high hydrodynamic friction in the water. This also affects the maneuverability of the vehicles while in water.

Some amphibious vehicles, like the one disclosed in U.S. Pat. No. 3,903,831, have retractable wheels that rotate, in the vertical plane, to a position inside the hull. However, this type of wheels retraction requires a lot of floor space and is thus not well adapted to a small amphibious vehicle and to an amphibious vehicle that does not have a lot of available space. This type of wheel retraction is also not well adapted to a vehicle that has many wheels or caterpillar tracks.

The present invention resolves this problem by retracting the wheels through the sides of the hull in order to have a more compact wheel retraction system and a caterpillar tracks retraction capability.

SUMMARY OF THE INVENTION

The object of the present invention is to provide an amphibious vehicle comprising:

(a) a buoyant hull having two sides, each of the two sides being provided with an enclosure for storing a ground traction means able to revolve, while the vehicle is in water, between a retracted position and a ground engaging position about a longitudinal axis, the enclosure being coverable by a hatch panel, the hull having a hydrodynamic surface when the hatch panel covers the enclosure, (b) a means to move the hatch panels between a covered or uncovered position;

(c) a water propulsion means for propelling and steering the vehicle in water;

(d) a ground propelling means comprising:
a means to drive the ground traction means,
a means to revolve each of the ground traction means between the position inside the enclosure in the hull and a ground-engaging position for land cruising,
a means to lock the ground traction means in the ground-engaging position for land cruising, and
a means to steer the vehicle on land.

According to a preferred embodiment, each of the ground traction means comprises a set of at least two wheels linked to the vehicle by a longitudinal shaft. The ground traction means may comprise a set of caterpillar tracks instead of the set of wheels.

According to another preferred embodiment, the amphibious vehicle further comprises an engine for driving a hydraulic pump connected to at least one hydraulic motor of the drive means. The means to revolve each of the ground traction means is preferably a hydraulic piston, but can be substituted for a manual mechanism.

According to a still preferred embodiment, the at least one motor comprises a hydraulic motor associated with each ground traction means on each of the sides, which is linked to the ground traction means by a gear assembly. This gear assembly comprises a first gear associated with the ground traction means and a second gear associated with the motor. The second gear is translatable to mesh with the first gear. The two gears are separated from each other when the ground traction means are revolved in order to not interfere with the revolving.

Preferably, the wheels of each of the sets of wheels are linked together by means of a plurality of chains. The longitudinal shaft may be a hollow shaft encasing the chains.

According to a preferred embodiment, the means to steer the vehicle on land is a valve reducing, stopping or reversing the flow of hydraulic fluid affecting the rotation of the hydraulic motor on one of the sides of the hull, thereby creating a speed differential between the sides.

According to another preferred embodiment, the means to propel the vehicle in water is a propeller driven by a second hydraulic motor supplied by the hydraulic pump. Preferably, the hydraulic motor and the propeller are slidably mounted on a rear part of the vehicle and are lowered when the vehicle is in water. The sliding hydraulic motor and propeller may be moved by a hydraulic piston.

According to a still preferred embodiment, the panels close hermetically the enclosures. Preferably, the hatch panels are sliding and are moved by hydraulic pistons.

A pump may be provided to remove water in the enclosures after a hatch panel closing, thereby making the vehicle lighter and more buoyant.

According to a preferred embodiment, the means to lock the sets of wheels in position for land-cruising is a pin locking the longitudinal shaft to the hull.

The number of wheels of this amphibious vehicle is preferably three.

A non restrictive description of a preferred embodiment will now be given with reference to the appended drawings.

DESCRIPTION OF A PREFERRED EMBODIMENT

Figure 1:
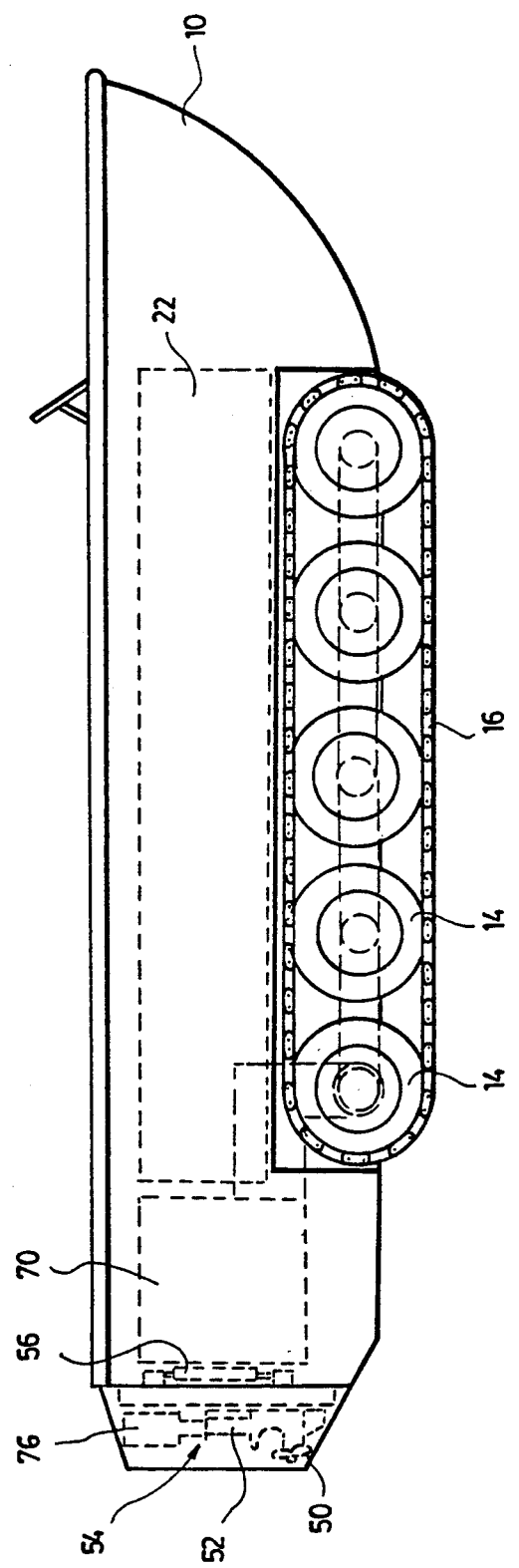
FIG. 1 is a side elevational view of the amphibious vehicle according to the invention.

The amphibious vehicle according to the invention as shown in FIG. 1 comprises a buoyant hull 10 designed for cruising and preferably has a flat nose 12 which is believed to be more convenient on land than the front shape of a conventional boat.

Figure 2:
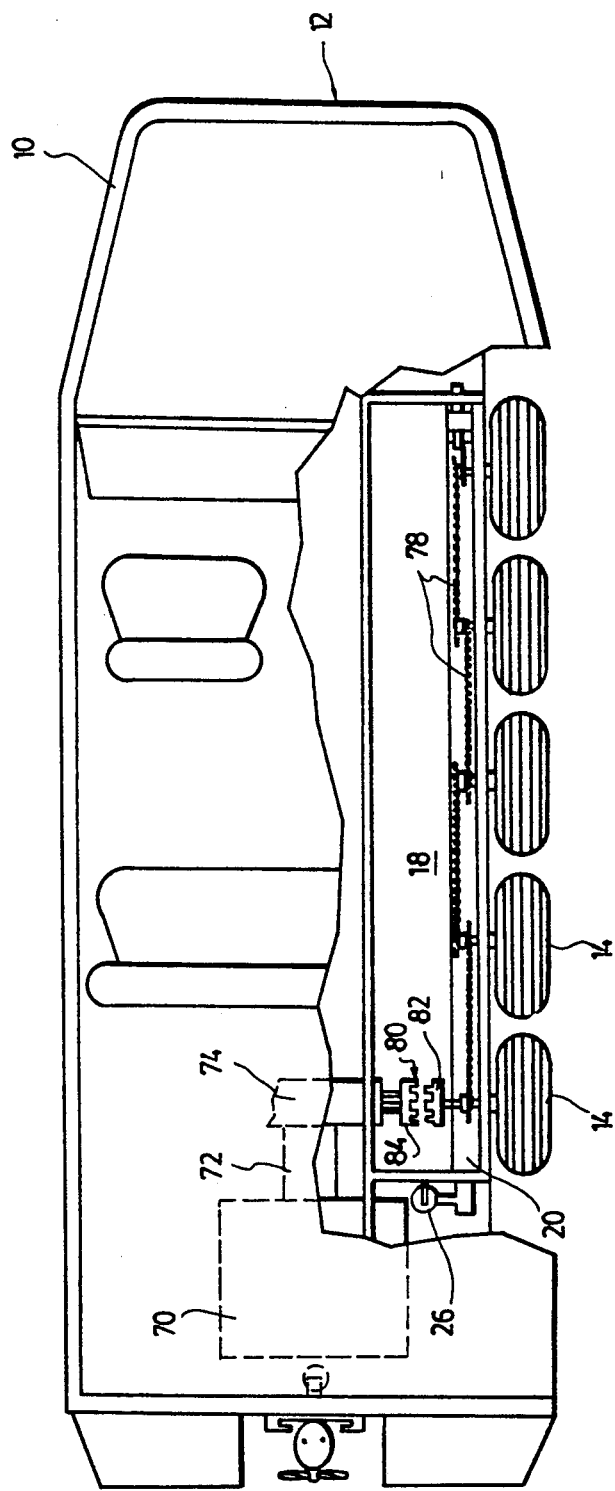
FIG. 2 is a cross-sectional upper elevational view of the amphibious vehicle.

The vehicle moves on land by means of a plurality of wheels 14 located on each side of the hull 10. The vehicle can move on the ground with at least two wheels 14 located on each side of the hull 10. Five wheels are installed on each side of the hull 10. The wheels 14 may be wheels designed to drive caterpillar track 16 or may be tires, as shown in FIG. 2, adapted to off-road conditions.

Figure 3:
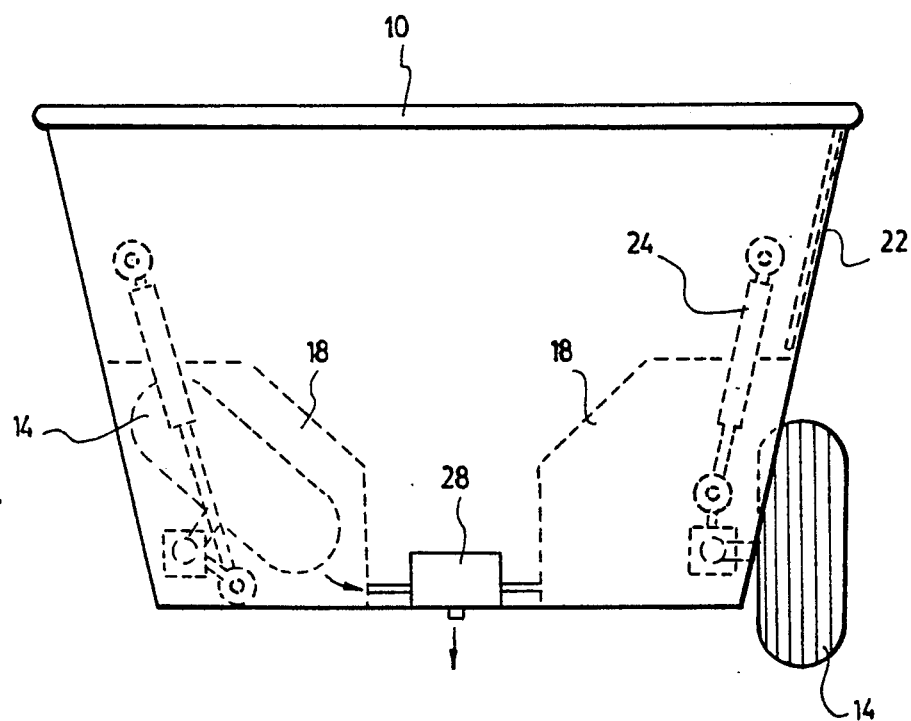
FIG. 3 is a rear elevational view showing where the wheels are located in said enclosures and what is their position when land-cruising.

The hull 10, on each of its two sides, is provided with a sealed enclosure 18 for storing the wheels while the vehicle is in water. This enclosure 18 is sealed off from other parts of the hull 10 in order to not let the water go inside the hull 10. The wheels 14 are able to revolve between their retracted position and a ground engaging position, about a hollow longitudinal shaft 20 operatively attached to the hull 10. The outward revolving of the wheels 14 is done while the vehicle is in water, prior to going on land. The inward revolving of the wheels 14 is also done while the vehicle is in water, more specifically after the vehicle went from the ground to the water. The position of a retracted wheel 14 and an unretracted wheel 14 is shown in FIG. 3. The revolving of the wheels 14 is done simultaneously on both sides of the hull 10.

A hatch panel 22 covers the enclosures 18 in order to have a hydrodynamic surface on the two sides of the hull 10. The hatch panels 22 are moved either by a manual mechanism (not shown) or by an hydraulic piston (not shown) located on each panel 22. The hatch panels 22 close the enclosures 18 hermetically in order to be able to pump out the water in the enclosure and replace it with air, thus making the hull 10 more buoyant and the vehicle lighter. As can be seen in FIG. 3, a pump 28 is used to remove the water from the two enclosures 18.

When the wheels 14 are retracted and the enclosures are closed, the vehicle will be similar to a boat. In water, the vehicle is propelled by a propeller 50 mounted on a sliding unit 52 which is lowered when water-cruising and raised when the vehicle is on land. The sliding unit 54 is moved by means of a hydraulic piston 56.

An engine 70 is used to provide power to a hydraulic pump 72. The hydraulic pump 72 drives the two hydraulic motors 74, each located on each side of the hull 10. The hydraulic pump 72 is also connected to a hydraulic motor 76 located on top of the sliding unit 54 to drive the propeller 50.

The hydraulic motors 74 are linked to the wheels by means of a gear assembly 80 which comprises a first gear 82 associated with the wheels 14 and a second gear 84 associated with the hydraulic motor 74. The second gear 84 is axially translatable to mesh with the first gear 82 in order to connect or disconnect the hydraulic motors 74 to the wheels 14. Gears 82 and 84 have teeth whose opposed axial ends are tapered such that an automatic alignment takes place when gear 84 is moved to engage gear 82. By providing gears 82 and 84 with a large number of teeth, namely 6 to 12, the angular displacement during engagement is reduced.

The wheels are connected to each other by means of a plurality of chains 78 as shown in FIG. 2, so that all wheels 14 are driven which is very suitable for off road driving. The chains 78 are preferably located inside the longitudinal shaft 20 in order to keep them clean and dry even if the vehicle is travelling in water or in the mud.

While on ground, the vehicle is steered by means of a speed differential between the set on wheels 14 of each side of the hull 10. The means to steer the vehicle is a valve for reducing, stopping or reversing the flow of hydraulic fluid affecting the rotation of the hydraulic motors on one of the sides in order to create a speed differential between the sides. This way of steering the vehicle is similar to the way a military tank or other caterpillar tracked vehicle turns.

A hydraulic piston 24 is used to apply a torque revolving each of the two sets of wheels 14 around the longitudinal shaft 20 of about 120°. When the wheels 14 are in a ground engaging position, the longitudinal shaft 20 is locked in this position by means of a pin 26 braking the torque generated around the longitudinal shaft 20 by the weight of the vehicle.

The same can be carried out by using electric motors instead of hydraulic motors. The hydraulic pump 72 could then be substituted for a generator driven by the engine 70.

The number of wheels 14 on each side is between 3 and 6, thus not being limited to five wheels. Of course, it is also possible to have several gears assemblies 80 on each side connected to several hydraulic motors 74.

I claim:

1. An amphibious vehicle comprising:
   (a) a buoyant hull having two sides and a bottom, each of said two sides being provided with an enclosure having a side opening in one of said sides for storing a ground traction means able to revolve through said side opening, while said vehicle is in water, between a retracted position and a ground engaging position about a longitudinal axis, each of said side opening being coverable by a side hatch panel, said hull having hydrodynamic side surfaces when said hatch panels cover said openings,
   (b) a means to move said hatch panels between a covered or uncovered position;
   (c) a water propulsion means for propelling and steering said vehicle in water;
   (d) a ground propelling means comprising:
      a means to drive said ground traction means,
      a means to revolve each of said ground traction means between said position inside said enclosure in said hull and a ground engaging position for land cruising,
      a means to lock said ground traction means in said ground engaging position for land cruising, and
      a means to steer said vehicle on land.

2. The amphibious vehicle of claim 1, wherein each of said ground traction means comprises a set of at least two wheels linked to said vehicle by a longitudinal shaft.

3. The amphibious vehicle of claim 1, wherein each of said ground traction means comprises a set of caterpillar tracks linked to said vehicle by a longitudinal shaft.

4. The amphibious vehicle of claim 2, further comprising a hydraulic pump driven by an engine and connected to at least one hydraulic motor of said drive means.

5. The amphibious vehicle of claim 4, wherein said means to revolve each of said ground traction means comprises a hydraulic piston.

6. The amphibious vehicle of claim 1, wherein said means to revolve each of said ground traction means comprises a manual mechanism.

7. The amphibious vehicle of claim 4, wherein said at least one hydraulic motor is linked to said ground traction means by a gear assembly comprising a first gear associated with said ground traction means and a second gear associated with said motor, the second gear being translatable to mesh with the first gear, said two gears being separated from each other when said traction means are revolved in order to not interfere with said revolving.

8. The amphibious vehicle of claim 7, wherein said wheels of each of said set of at least two wheels are linked together by means of a plurality of chains.

9. The amphibious vehicle of claim 8, wherein said longitudinal shaft is a hollow shaft encasing said chains.

10. The amphibious vehicle of claim 4, wherein said means to steer said vehicle on land is a valve reducing, stopping or reversing the flow of hydraulic fluid affecting the rotation of said hydraulic motor on one of said sides of said hull, thereby creating a speed differential between said sides.

11. The amphibious vehicle of claim 4, wherein said means to propel said vehicle in water is a propeller driven by a second hydraulic motor supplied by said hydraulic pump.

12. The amphibious vehicle of claim 11, wherein said hydraulic motor and said propeller are slidably mounted on a rear part of said vehicle and are lowered when said vehicle is in water.

13. The amphibious vehicle of claim 12, wherein said sliding hydraulic motor and propeller are moved by a hydraulic piston.

14. The amphibious vehicle of claim 1, wherein said hatch panels close hermetically said enclosures.

15. The amphibious vehicle of claim 1, wherein said hatch panels are sliding and are moved by hydraulic pistons.

16. The amphibious vehicle of claim 14, further comprising a pump to remove water in said enclosures after a hatch panel closing, thereby making said vehicle lighter and more buoyant.

17. The amphibious vehicle of claim 2, wherein said means to lock said set of at least two wheels in position for land cruising is a pin locking said longitudinal shaft to said hull.

18. The amphibious vehicle of claim 2, wherein said set of at least two wheels has three wheels.

19. An amphibious vehicle comprising:
(a) a buoyant hull having two sides, each of said two sides being provided with an enclosure for storing a ground traction means able to revolve between a retracted position and a ground-engaged position about a longitudinal axis and linked to said vehicle by a longitudinal shaft, said enclosure being hermetically covered by a sliding panel moving downward and upward to cover or uncover said location, thereby giving said hull a hydrodynamic surface,
(b) a means to move said sliding panels,
(c) an in water propelling means comprising a sliding unit that is lowered when said vehicle is in water and raised when said vehicle is on the land, said sliding unit comprising:
a first hydraulic piston to move said sliding unit,
a first hydraulic motor supplied by a hydraulic pump driven by an engine, and
a propeller driven by said first hydraulic motor,
(d) a ground propelling means comprising:
a second hydraulic piston to revolve each of said ground traction means around its longitudinal axis from a position inside said location in said hull to a position for land cruising, said sets of wheels revolving back into said location after returning into water,
a pin to lock said longitudinal shaft in said position for land cruising,
a second hydraulic motor driving each of said traction means to move said vehicle on the land, said second hydraulic motor being linked to said traction means by a gear assembly wherein two gears meshed together, said two gears being separated from each other when said traction means are revolved in order to not interfere with said revolving,
a valve lowering, stopping or reversing the flow of hydraulic fluid affecting the rotation of said second hydraulic motor on one of said sides of said hull, thereby creating a speed differential between said sides;
(e) a pump to remove water in said enclosures after a sliding panel is closed, thereby making said vehicle lighter and more buoyant.

* * * * *